United States Patent [19]

Donaldson et al.

[11] 4,281,289
[45] Jul. 28, 1981

[54] METHOD OF DETERMINING INTERWELL OIL FIELD FLUID SATURATION DISTRIBUTION

[75] Inventors: Erle C. Donaldson; F. Dexter Sutterfield, both of Bartlesville, Okla.

[73] Assignee: The United States of America as represented by the United States Department of Energy, Washington, D.C.

[21] Appl. No.: 21,141

[22] Filed: Mar. 16, 1979

[51] Int. Cl.³ .......................... G01V 3/02; G01V 3/20
[52] U.S. Cl. .................................. 324/355; 324/372; 324/376
[58] Field of Search ............... 324/351, 372, 366, 355, 324/376

[56] References Cited

U.S. PATENT DOCUMENTS

| | | | |
|---|---|---|---|
| 2,183,565 | 12/1939 | Hawley | 324/372 |
| 2,297,754 | 10/1942 | Ennis | 324/351 X |
| 3,098,198 | 7/1963 | Salimbeni | 324/351 |
| 3,151,291 | 9/1964 | Eisler | 324/372 X |

OTHER PUBLICATIONS

Rust, C. F., "Electrical Resistivity Measurements-and Four-Electrode Methods", *Petroleum Trans.*, AIME, vol. 195, 1952 pp. 217-224.

Archie, G. E., "The Electrical Resistivity Log-in Determining-Reservoir Characteristics", *Petroleum Trans.* AIME, vol. 146, 1942, pp. 54-62.

Carter, Lee S., "The Relationship Between-and Brine Saturation", *The Petroleum Engineer*, Nov. 1951, pp. B-60, 63, 64, 66, 68.

Wyllie et al., "Application of Electrical Resistivity Meas.-in Porous Media", *Bull. of the Amer. Ass. of Petrol. Geol.* vol. 36 No. 2 Feb. 1952, pp. 359-403.

*Primary Examiner*—Gerard R. Strecker
*Attorney, Agent, or Firm*—Frank H. Jackson; Dean E. Carlson; James E. Denny

[57] ABSTRACT

A method of determining the oil and brine saturation distribution in an oil field by taking electrical current and potential measurements among a plurality of open-hole wells geometrically distributed throughout the oil field. Poisson's equation is utilized to develop fluid saturation distributions from the electrical current and potential measurement. Both signal generating equipment and chemical means are used to develop current flow among the several open-hole wells.

8 Claims, 7 Drawing Figures

METHOD OF DETERMINING INTERWELL OIL FIELD FLUID SATURATION DISTRIBUTION

CONTRACTUAL ORIGIN OF THE INVENTION

The invention described herein was made in the course of, or under, a contract with the UNITED STATES DEPARTMENT OF ENERGY.

BACKGROUND OF THE INVENTION AND PRIOR ART DISCLOSURE

The declining production of domestic crude oil has placed considerable emphasis on the development of new technology for the extraction of residual oil remaining in the oil field after cost effective primary and secondary methods have been utilized to produce oil from the field. Research developing tertiary methods for oil removal has emphasized the importance of accurately determining the oil saturation distribution in an oil field. Three principal methods currently are used for estimating the fluid saturation as opposed to fluid saturation distributions, in oil field:

(1) Core analysis is the extraction of cores followed by a laboratory analysis of the oil content;
(2) Logging is the interpretation of electrical, acoustical and radioactive signals obtained from specialized tools lowered into representative species of the wells and
(3) Material balance calculations are the estimation of the remaining fluid content in the field by subtracting produced fluid volume from the initial estimates of the reservoir capacities or saturations.

Each of these methods has varying degrees of accuracy depending upon laboratory and sampling techniques. The core analysis method yields the fluid saturation of a small sample which generally is contaminated with fluids used in drilling. The logging technique produces measurements of fluid saturation but only within a few feet of the well bore or the well hole and these measurements may also yield grossly inaccurate estimates of the formation saturation if water coning has occurred at the well. Finally, the material balance calculations are dependent upon the accuracy of the initial oil saturation estimates as well as production records, all of which may be 25 to 40 years old, and also are dependent upon the calculated estimates of pressure decline in the reservoir. Accordingly, none of these methods yield information relative to interwell fluid saturation distribution, unless new wells are drilled throughout the field.

Dry sandstones, unconsolidated sands, carbonate rocks, oil and gas have such high resistance to an electrical current that they are considered to be insulators. Minerals, especially clay and pyrite, frequently associated with the sedimentary rocks that make up most petroleum reservoirs are conductive and therefore complicate the interpretation of resistivity logs. Assuming that the porous rock matrix is non-conductive, then the electrical properties depend only upon the brine or connate water contained in the pores of the rock and the geometry of the pores. Then, the conductivity of a fluid-saturated rock is due to the ions of the dissolved salt that make up the brine and the magnitude of the electrical conductivity depends upon the salt concentration and temperature. Pioneer work in the field was performed by G. E. Archie as set forth in his paper "The Electrical Resistivity Log As An Aid In Determining Some Reservoir Characteristics", Trans. AIME, v. 146, 1942, PP. 54–62.

As is known in the art, the resistivity of a material is the reciprocal of the conductivity and is defined as:

$$\rho = (r \cdot A)/L$$

wherein: $\rho$ is resistivity expressed in ohm-meters; r is resistance expressed in ohms; A is area expressed in square meters; and L is length of current path expressed in meters. The value of the resistivity of a rock which is completely saturated with brine of a given concentration at a specific temperature was defined by Archie as follows:

$$F = R_o/R_w = \phi^{-m}$$

wherein F is the formation resistivity factor; $R_o$ is the resistivity of rock 100 percent saturated with brine expressed in ohm-meters; $R_w$ is resistivity of brine expressed in ohm-meters; $\phi$ is the porosity and m is an empirical constant. Resistivities of oil field brines have been investigated and values published for varying temperature values. It has been established that the formation factor increases as the sand becomes more cemented, the degree of sand cementation affecting the value of the exponent m.

Archie gives an empirical relationship for water saturation. For clean, water-saturated sands, the average value of n is 2; hence, the water saturation may be estimated with a fair degree of accuracy using the empirical relationship:

$$S_w = (R_o/R_t)^{1/n} = (FR_w/R_t)^{0.5}$$

wherein: $S_w$ is brine saturation; $R_t$ is resistivity of rock with brine and another fluid; and n is an empirical constant. Accurate information is difficult to obtain when the sedimentary formation being measured contains variable amounts of shale and silty materials. Data have been developed showing that wet rocks containing clay and other minerals was found to be equal to the sum of the conductivity of the rock and the brine. Theories have been advanced that the abnormal electrical characteristics of shaly materials are due to the absorption of ions from the brines by the shaly materials and mathematical interpretations based on laboratory results seem to verify these theories.

SUMMARY OF THE INVENTION

This invention relates to a method of determining the oil saturation distribution in an oil and brine bearing formation, and more particularly to a method in which electrical measurements are made between wells.

An important object of the present invention is to provide a method of determining the oil saturation distribution in an oil and brine bearing formation penetrated by a plurality of open-hole wells comprising the steps of introducing an electrode into a first well, introducing an electrode into a second well, interconnecting the first and second electrodes with an electrical conductor, providing means for generating a current between the electrodes in the electrical conductor, measuring the current between the electrodes, calculating the apparent resistivity of the oil and brine bearing formation from the electrical current measurements, and determining the oil saturation distribution between wells from the resistivity calculation.

Another object of the present invention is to provide a method of the type set forth in which there is introduced an effective amount of an oxidizing solution into a first well and an effective amount of a reducing solution into a second well, introducing a first electrode into the first well in contact with the oxidizing solution therein, introducing a second electrode into the second well in contact with the reducing solution therein, interconnecting the first and second electrodes with an electrical conductor, measuring the current between the electrodes, calculating the apparent resistivity of the oil and brine bearing formation from the electrical current measurements, and determining the oil saturation between wells from the resistivity calculations.

Another object of the present invention is to provide a method of the type set forth in which there is impressed an electrical potential between the electrodes between wells providing an electrical current therebetween, measuring the current between the electrodes, calculating the apparent resistivity of the oil and brine bearing formation from the electrical current measurements, and determining the oil saturation distribution between wells from the resistivity calculations.

A final object of the present invention is to provide a plurality of open-hole wells geometrically spaced throughout an oil and brine bearing formation with each well having an appropriate electrode therein and utilizing Poisson's equation to calculate the brine saturation between the geometrically spaced wells, thereby to provide data for determining the oil saturation distribution therebetween.

These and other objects of the present invention may be more readily understood by reference to the following specification taken in conjunction with the drawings, in which:

DESCRIPTION OF THE PREFERRED EMBODIMENT

To determine the apparent resistivity, $R_t$, between wells, a current must pass through the formation between electrodes. By use of Archie's equation, the saturation distribution of brine throughout the field can be mapped. An electrical potential may be developed between wells using dc or ac impressed EMF's between electrodes in the wells or by forming an in situ battery by introducing a reducing solution, as for example ferrous chloride, into one well and an oxidizing solution, as for example ferric chloride, into another well, all within the same oil-producing formation.

Figure 1:
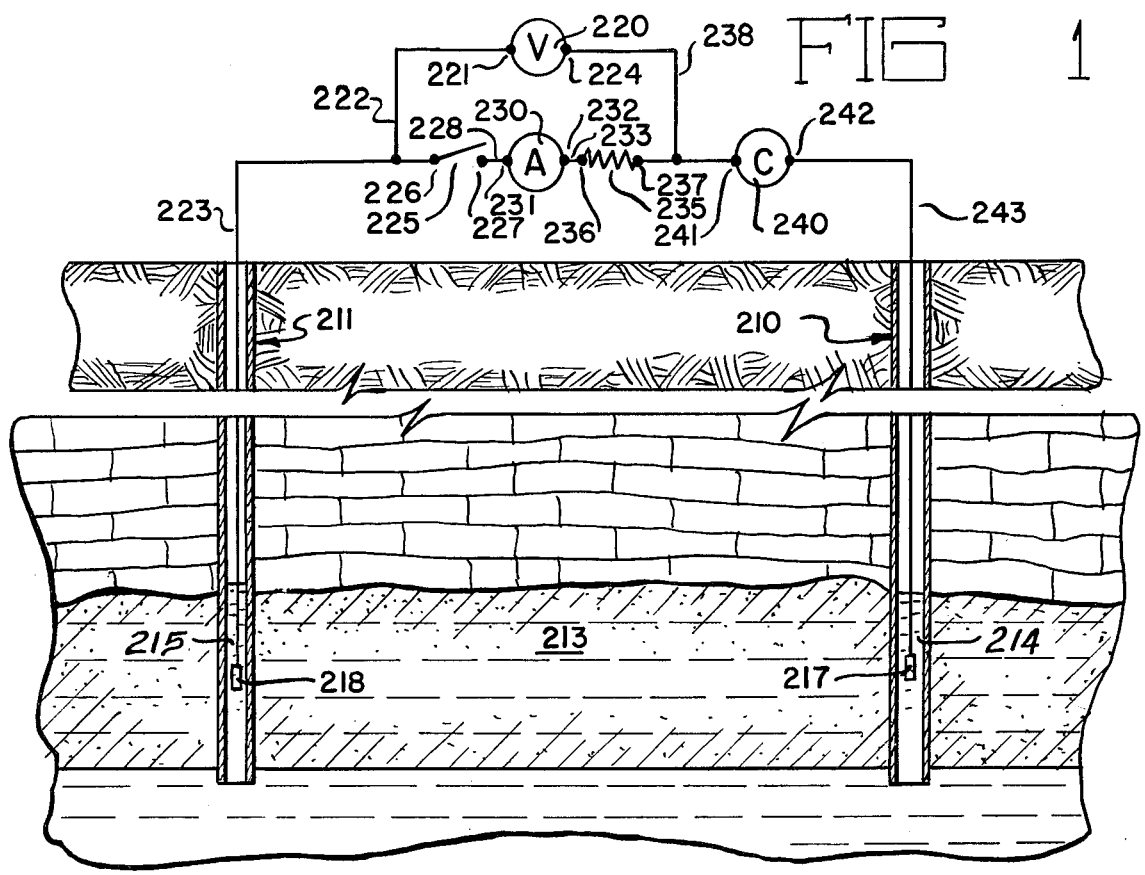
FIG. 1 is a schematic diagram showing interwell electrical connections.

When oxidizing and reducing solutions are introduced interwell and electrodes in the wells are connected by means of an electrical conductor at the surface, electric current flows between the wells in the same manner as the operation of a storage battery. The electric current flows from the oxidizing solution to the reducing solution through the brine and back through the conducting wire on the surface, see FIG. 1, wherein open hole wells 210 and 211 are each provided with an electrode 217 and 218 placed within the same oil and brine bearing formation 213. An oxidizing solution 214 is in well 210 and a reducing solution 215 is in well 211. A voltmeter 220 has one terminal 221 thereof connected by an electrical conductor 222 to a terminal 226 of a switch 225, to which is connected by conductor 223 the electrode 218 in the well 211. The terminal 227 is connected by a conductor 228 to terminal 231 of ammeter 230 which has the other terminal 232 thereof connected to terminal 236 of resistor 235 by conductor 233. The other terminal 237 of the resistor 235 is connected to terminal 224 of the voltmeter 220 by a conductor 238. Finally, a commutator 240 has one terminal 241 thereof connected by conductor 238 to the resistor 235 and has the other terminal 242 thereof connected by the conductor 243 to the electrode 217 in the well 210. This chemically induced electric current traveling through the interstitial fluids is available to measure the electrical resistivity of the formation, $R_t$, which is directly related to the oil saturation, and may be calculated through the use of Archie's equation and Poisson's equation.

The other processes disclosed and discussed herein require impressing a voltage between electrodes placed in individual wells and causing either dc or ac current to flow between wells, thereby providing the interwell electric current necessary to measure the electrical resistivity of the formation and thereafter the fluid saturation distributions.

For two-dimensional systems with a one-dimensional path (cores) $R_t$ is calculated directly by the simple relationship:

$$R_t = \phi \, E_t A l / \left( I_t \sqrt{2} \, L \right)$$

wherein: $E_t$ is the electric potential measured when more that one fluid is in the porous matrix, expressed in volts; and $I_t$ is the current when more than one fluid is in the porous matrix, expressed in amperes.

However, the two-dimensional path and the three-dimensional system is much more complicated and the method used to calculate $R_t$ was a finite difference solution to Poisson's equation.

The apparent resistivity distribution between wells in a miniature three-dimensional field was calculated by first assuming that the conductive medium between the measuring electrodes consisted of a homogenous, isotropic layer of constant thickness. In actual practice this is undoubtedly an over simplification of the system; however, provisions are made in the computations which accommodate variations in homogeneity and thicknesses to allow for actual condition in the field. These computations yield an estimation of resistivity variation in two horizontal dimensions which is used to determine the brine saturation distribution between wells in the field.

The behavior of an electric current in a nonuniform medium is governed by Poisson's equation:

$$-\Delta \cdot \left[ \frac{1}{\rho(x,y,z)} \cdot \Delta V_{(x,y,z)} \right] = \frac{\partial Q_{(x,y,z)}}{\partial t} = q_{(x,y,z)}$$

Using the assumptions introduced above, the equation is restricted to: (a) two independent variables (x and y) representing the surface, (b) an effective thickness, $\phi Z_{ij}$, which is specified at each node of the finite difference grid, and (c) an apparent homogeneous medium in which $\rho$ is a constant value between a pair of measuring electrodes. This reduces the equation to a more manageable form:

$$-\left[ \frac{\partial}{\partial x}\left(Z_{i,j}\frac{\partial V}{\partial x}\right) + \frac{\partial}{\partial y}\left(Z_{i,j}\frac{\partial V}{\partial y}\right) \right] - \rho q_{(x,y)}/\phi = 0$$

The current supplied to the ground, by means of the electrodes, is expressed in amperes; whereas, the current density, q, represents the rate of charge generation (or adsorption) per unit area normal to the path of current flow. Therefore, it is desirable to express q in terms of current flowing into the ground. When the current is supplied to a two-dimensional system, the current density at the electrode is represented by I/A where A is the area of the outer surface of the electrode and, therefore, the term $(\rho q_{(x,y)}/\phi)$ of the last equation becomes:

$$\rho q_{(x,y)}/\phi = \rho I/A\phi$$

Dirchlet boundary conditions ($V_{i,j}=0$ at all boundaries) were used because they yield an underestimation of potential rather than an overestimation. This is desirable because the test model was designed to represent a small laboratory model having perfectly insulated boundaries, far removed from the source and sink electrodes.

As is well known in the art, the influence of image electrodes was used. The finite difference grid was expanded and image electrodes identical to the original source and sink in magnitude and sign were included outside the actual boundary at a distance equal to the distance from the boundary to the actual electrode. This mathematical solution was included in the computer program developed to solve the aforementioned Poisson's equation.

Figure 2:
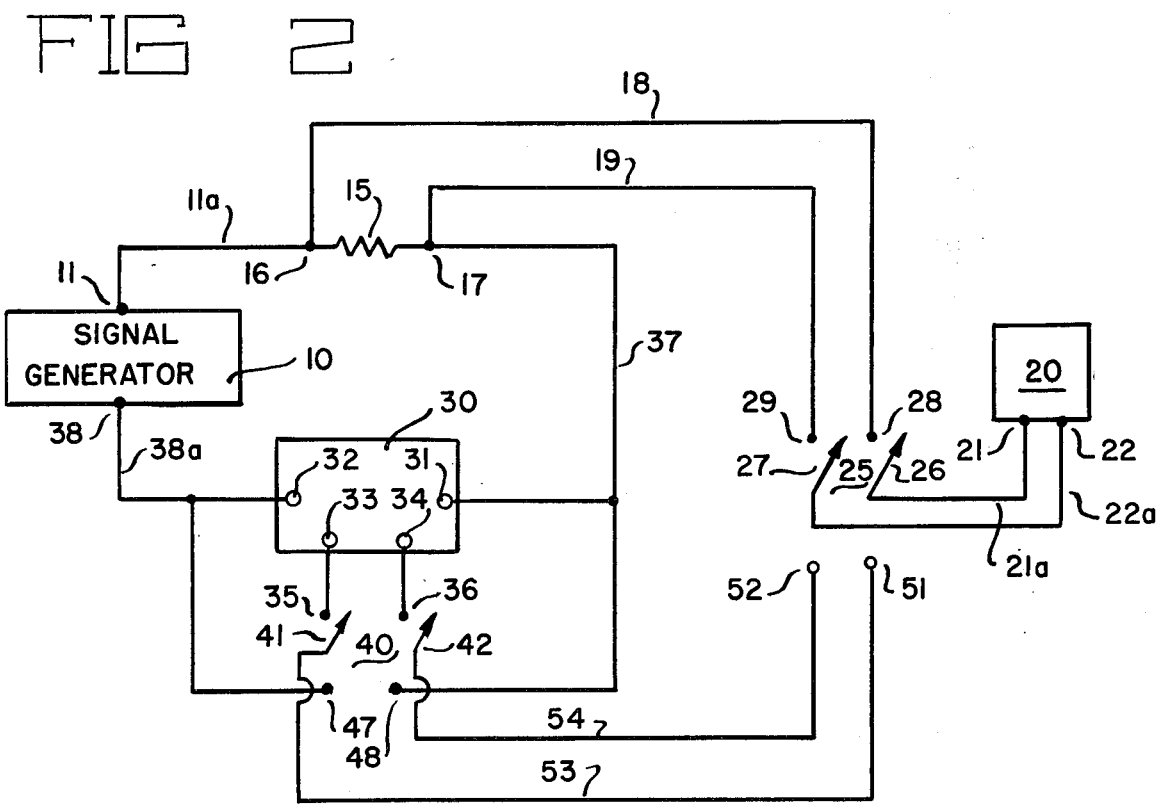
FIG. 2 is a schematic diagram of a circuit for obtaining electrical measurements from either a core or a model reservoir.

Referring now to FIG. 2 of the drawings, there is disclosed a schematic diagram illustrating the apparatus and circuit used to develop resistivity measurements for both cores and reservoirs. A signal generator 10 has one terminal 11 thereof connected to terminal 16 of a precision resistor 15 by a conductor 11a. A voltmeter 20 has the terminals 21 and 22 thereof connected respectively to the ganged together contacts 26 and 27 of a switch 25, via conductors 21a and 22a, respectively. Electrical conductors 18 and 19 respectively interconnect resistor terminals 16 and 17 and terminals 28 and 29 of the switch 25, whereby voltmeter 20 can be connected across resistor 15 by completing the circuit between the switch contacts 26 and 27 and the terminals 28 and 29, respectively.

The specimen 30 to be measured is provided with four electrodes designated 31, 32, 33 and 34 located as illustrated and each having an appropriate electrical terminal. Electrode 31 is connected by conductor 37 to the terminal 17 of the precision resistor 15. Electrode 32 is connected by conductor 38a to terminal 38 on the signal generator 10. It is seen therefore that the resistor 15 and test material 30 are always in the circuit with the signal generator 10.

A switch 40 has contacts 41 and 42 movable between a position in which the contacts are respectively in contact with terminals 35 and 36 of the electrodes 33 and 34, respectively, and a position which the contacts 41 and 42 are in contact with terminals 47 and 48, respectively, which are connected to conductors 38a and 37, respectively. Contacts 41 and 42 are also independently movable. The switch 40 has the contacts 41 and 42 thereof respectively connected by conductors 53 and 54 to terminals 51 and 52 of the switch 25.

As stated, FIG. 2 illustrates the test circuit for either core samples or the three-dimensional reservoir samples. The voltmeter 20 was either a Fluke model 8600a digital multimeter with both ac and dc capability or a Keithley model 160B digital multimeter. The circuitry illustrated in FIG. 2 is essentially that disclosed by C. S. Rust in his article entitled "Electrical Resistivity Mesurements On Reservoir Rock Samples By The Two Electrode and Four Electrode Methods", AIME, v.195, 1952, PP. 217-224. For ac measurements, a Hewlet Packard 200B ac generator was used as the signal generator 10 with a frequency range of 20 Hz to 20 KHz and a 0-20 v output was used as the signal generator. A Hewlet Packard model 211A generator was used for the signal generator to generate square wave dc, the frequency range of model 211A is 1 Hz to 1 megaHz with 0-20 v output. During the dc square wave test, the dc signal was pulsed at frequencies between 60 and 1000 cycles per second.

The current in the circuit was determined by measuring the voltage drop across the precision resistor 15 by moving the ganged contacts 26 and 27 of switch 25 into contact with terminals 28 and 29 respectively connected by conductors 18 and 19 to the terminals 16 and 17 of the resistor 15. In this case, the voltmeter 20 measures the voltage drop across the resistor 15. Input electrodes 31 and 32 may be used as measuring electrodes when switch 40 has the contacts 41 and 42 thereof respectively connected to terminals 47 and 48, and in this configuration the test circuit is in the two-electrode mode. The four-electrode measurement is taken when switch 40 has the contacts 41 and 42 thereof in contact respectively with terminals 35 and 36 of the electrodes 33 and 34. In this situation, the test circuit is in the four-electrode mode and measurements are taken at electrodes 33 and 34. The three-electrode mode is when one of contacts 41 and 42 is in contact with the respective one of terminals 35 and 36 and the other contact is in electrical contact with the respective one of contact 47 or 48. This configuration permits a measurement with either, but not both, electrodes 33 or 34.

In the three-dimensional reservoir model, the four-electrode measurements were unsatisfactory and either the two-or-three-electrode mode or configuration was used by having the switch 40 positioned as previously discussed, whereby at least one of the input electrodes 31 or 32 was always used as a measuring electrode. The fluids used to saturate the core samples and also the three-dimensional reservoirs were an artificial brine solution containing 30.7 grams sodium chloride per liter of water with a resistivity of 0.215 ohm meters and a 31.9° API crude oil obtained from the Bartlesville Sandstone at a depth of 664 to 677 feet in Nowata County, Okla. The only treatment of the oil was centrifugation to remove bottom sludge and water.

Figure 3:
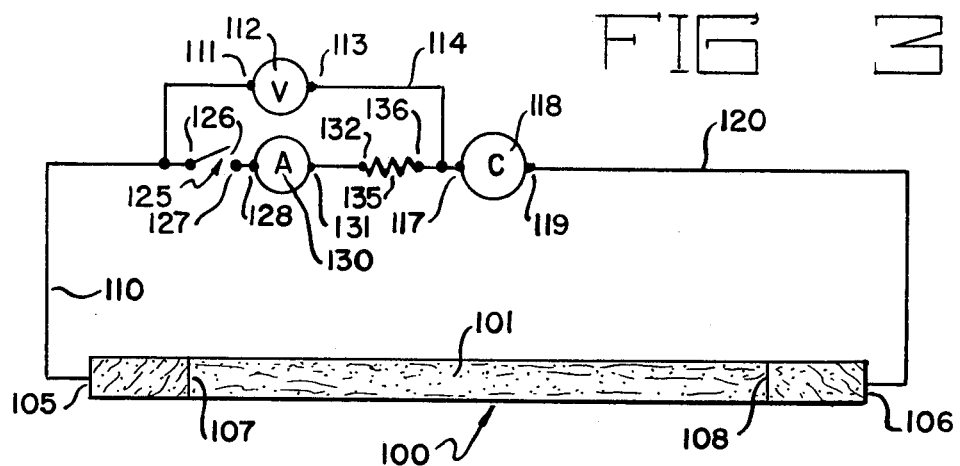
FIG. 3 is a schematic diagram of a circuit for obtaining electrical measurements of a core sample.

Referring now to FIG. 3 of the drawings, there is disclosed a sample core 100 having an elongated cylindrical body 101 76 centimeters in length and 3.8 centimeters in diameter. A platinum screen electrode 105 was fixed at one end thereof and another platinum screen electrode 106 was fixed at the other end thereof. An intermediate electrode 107 was affixed to the core 100 by painting a band of silver print conductive paint around the circumference of the core 15.2 centimeters from the platinum screen electrode 105, and similarly, another intermediate electrode 108 was positioned 15.2 centimeters inwardly of the platinum screen electrode 106 by painting another band of silver print conductive paint about the circumference of the core 100. The bare ends of two insulated leads were respectively inserted in the electrodes 107 and 108 which were used in the four-electrode mode and correspond to electrodes 33 and 34 of FIG. 2, this not being illustrated in detail. The electrodes 105 and 106 have leads which are isolated from the silver band electrodes 107 and 108 by plexiglass end pieces and a rubber insulating sleeve, this construction not being illustrated in detail.

The cores tested were obtained from an outcrop of the Cottage Grove Sandstone about two miles north of Dewey, Okla., this formation being a very uniform sandstone having a porosity of about 26%.

The core 100 was dried and weighed having a core weight of 1604.0 grams, the core 100 was thereafter saturated with 227 milliliters of brine, as previously described, and assembled with end pieces, as previously described, and wrapped with a thermoplastic film such as Saran Wrap. Thereafter, the saturated core 100 wrapped as described was inserted into a Hassler-type holder, see U.S. Pat. No. 2,345,935 issued Apr. 4, 1944 to G. L. Hassler, the disclosure which is incorporated herein by reference. Water was thereafter pumped into the annulus between the rubber tube and the plexiglass outer tube to maintain a confining pressure on the core of 50 PSI. Five pore volumes of brine were pumped through the core 100 to insure a 100% brine saturation. The resistivity was measured using the four-electrode method previously described and illustrated in the description of FIG. 2, the $R_o$ value being 0.425 ohm meter. Oil was pumped into the core 100 keeping a meticulous material balance, until the core 100 was at a residual water saturation. Brine was thereafter pumped through the core 100 stopping periodically to obtain two-and-four-electrode resistivity measurements until residual oil saturation was reached.

The volume of all displaced fluids was measured and recorded as follows:

| | |
|---|---|
| Volume of brine initially in core, ml. | 227.0 |
| Volume of brine displaced by oil, ml. | 128.5 |
| Volume of brine remain in core, ml. | 98.5 |

The initial volume of oil in the core is equal to the volume of brine that was displaced by the oil (128.5 ml.)

| | |
|---|---|
| Initial volume of oil in core, ml. | 128.5 |
| Volume of oil displaced by brine, ml. | 57.1 |
| Volume of oil remaining in core, ml. | 71.4 |

A reducing solution was injected into one end of the core near the electrode 105 to a depth of 8 centimeters from the electrode and an oxidizing solution was placed similarly near electrode 106. 50 milliliters of 0.5 ferrous chloride was injected into one end and 25 milliliters 0.5 ferric chloride into the other end. Thus, 25 milliliters of each solution remained in the core 100 as no additional oil was removed from the core during injection of the oxidizing and reducing solutions.

Platinum screen electrode 105 was connected by a conductor 110 to a terminal 111 of a voltmeter 112, the other terminal 113 of the voltmeter 112 being connected by conductor 114 to a terminal 117 of a commutator 118. The other terminal 119 of the commutator 118 was connected by conductor 120 to the electrode 106.

A switch 125 had a terminal 126 thereof connected to the conductor 110 and another terminal 127 thereof connected to a terminal 128 of an ammeter 130. The ammeter 130 had the other terminal 131 thereof connected to a terminal 132 of a resistor 135, the other terminal thereof 136 being connected to the terminal 117 of the commutator 118. The resistor 135 used was a 51,000 ohm precision resistor and the resistivity of the core 100 containing residual oil saturation was determined using the electric current that was generated by the reducing and oxidizing solutions.

When the measurements were complete, 10 pore volumes of brine were pumped through the core 100 to remove the oxidizing and reducing solutions, and the core 100 was charged once more with 25 milliliters of a 0.5 molar solutions of cuprous and cupric chloride. Resistivity measurements were again taken. The copper solutions were removed from the core 100 and a third set of solutions was introduced by injecting 25 milliliters samples each of a 0.05 molar solution of mercurous chloride and hydrochloric acid and a 0.3 molar solution of mercuric chloride into the opposite ends of the core 100. Thereafter, resistivity measurements were again obtained.

Figure 4:
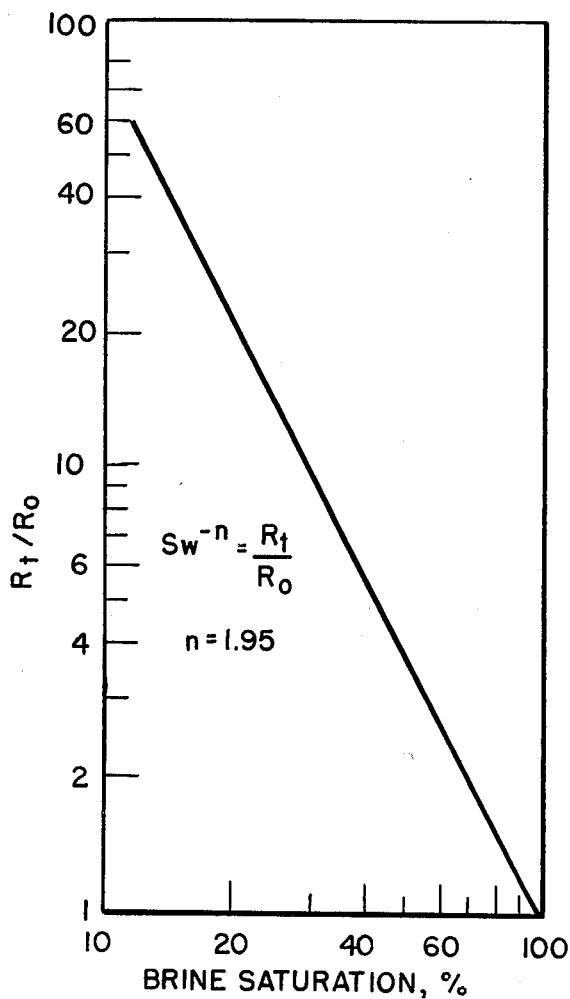
FIG. 4 is a graph showing resistivity as a function of brine saturation.

Table 1 set forth below illustrates the results of the resistivity measurements using the oxidizing and reducing solution and FIG. 4 illustrates the relationship between $R_t/R_o$ and brine saturation.

TABLE I

| Solutions | $R_t$, ohm meter | $S_{or}$,% FIG. 4 | $S_{or}$, ml | $S_{or}$, ml volumetric | Relative error | n |
|---|---|---|---|---|---|---|
| $Fe^{++}/Fe^{++}$ | 0.89 | 32.0 | 72.6 | 71.4 | 0.0168 | 2.0 |
| $Cu^+/Cu^{++}$ | 1.064 | 37.0 | 84.0 | 71.4 | 0.01765 | 2.4 |
| $Hg^+/Hg^{++}$ | 1.018 | 35.0 | 79.4 | 71.4 | 0.1120 | 2.3 |

$$\text{Relative error} = \frac{S_{or} - \text{volumetric } S_{or}}{\text{volumetric } S_{or}}$$

Archie proposed a vlue of two for the constant, n, in his equation, herein before set forth. The value of n for the results of two-and-four-electrode resistivity measurements is 1.95, see the slope of the line in FIG. 4. These results were obtained at various water saturations while displacing oil from the core 100 with additional brine solution and using impressed ac current to obtain the resistivity measurements.

The average of the values of n obtained from the oxidizing and reducing solutions is 2.2 and that obtained from the impressed ac current 1.95, both substantially agreeing with Archie's impirical correlations, which are accepted and used extensively for electric logging calculations.

A reservoir model was prepared by removing large particles of building sand by topping it through a number 14 sieve. A 6 centimeter layer of the sand was added to a wooden box constructed 127 centimeters square and 40 centimeters high with joints sealed with epoxy resin and the interior painted with a nonconducting marine paint. Cylindrical copper electrodes, 3 centimeters long with a diameter of 0.635 centimeters having insulated leads soldered at one end thereof, were inserted at the corners and at the centers of a 40 centimeter square grid in the center of the box. Two electrodes were imbedded in the grid halfway between the center and each of the two adjacent corner electrodes. The seven electrodes were inserted vertically with a top 1.5 centimeters below the surface of the sand.

14 liters of oil was mixed with the sand to make the sand oil-wet and to insure a relatively uniform saturation. Thereafter, brine was added making the volumetrically measured brine saturation for the entire reservoir 56% of pore volume. Measurements were thereafter obtained with all possible combinations of input and measuring electrodes, as previously described with respect to FIG. 2. Measured voltages were very small and showed substantial scatter for the four-electrode method. As a result of this scatter, only two-and-three-electrode measurements were obtained, as previously described. Both 20 Hz ac and dc inputs were used to measure the voltage in the reservoir. When dc voltage was used, the voltage was pulsed at frequencies between 60 and 1,000 cycles per second without changing the results. Calculations were made with Poisson's equation using the assumptions and boundary conditions hereinbefore stated. The computer program was written to solve the problems by successive line over-relaxation technique, which is an implicit method by which a line of components $V_{ij}$ is defined simultaneously in such an interrelated manner that it is necessary to solve a linear sub-system of the whole set of components at once before a single one can be determined. The equation is solved implicitly for each row, sweeping down the columns of the finite difference grid in a row-by-row fashion. The equation incorporated an iteration parameter in the tridiagonal matrix cell, see Breitenback, et al, "Solution of the Immiscible Fluid Flow Simulation Equations." J. Soc. Petrol. Eng., v. 9, No. 2, June, 1969, PP. 155-169; Crichlow, "Modern Reservoir Engineering"; Prentice-Hall, Inc., Englewood Cliffs, N.J. 1977, PP. 141-146; Forsythe, et al, "Finite-Difference Methods for Partial Differential Equations", John Wiley and Sons, Inc., New York 1960; and Vinal, "Storage Batteries", John Wiley and Sons, Inc., New York, 3rd Edition, 1949 PP. 163-172.

Figure 5:
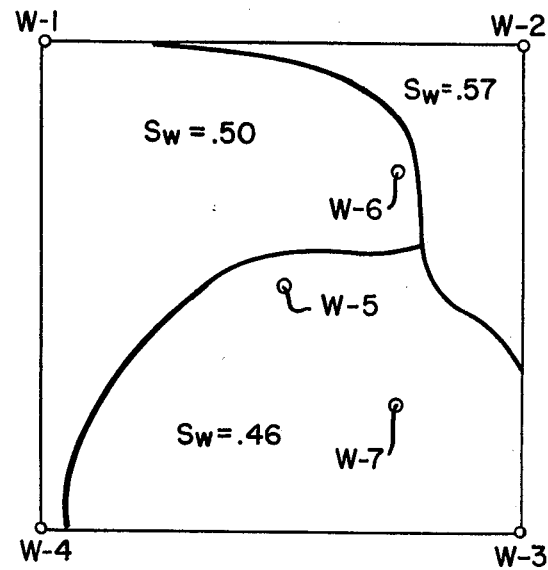
FIG. 5 is a graph showing brine saturation distribution calculated from Poisson's equation for a single layer, three-dimensional model reservoir.

The computer model gave very good results using the actual geometric area of one electrode, or since electrodes were identical and geometrically symmetrical and parallel, one and one-half the geometric area of two electrodes multiplied by porosity and water saturation values. Calculations of the brine saturations by the solution of Poisson's equation indicate an average saturation of 49.4% for 20 Hz square wave dc input and 44.0% for the 20 Hz ac input compared to a volumetric balance of 56.2. Table 2 set forth below gives the saturation distribution between wells, and FIG. 5 is a saturation distribution profile for the calculated brine saturation for the solution of Poisson's equation.

TABLE II

| Electrodes | Water saturations Poisson Equation | |
|---|---|---|
| | ac input | dc input |
| W-1--W-2 | 0.490 | 0.571 |
| W-1--W-3 | .414 | .492 |
| W-1--W-4 | .406 | .516 |
| W-1--W-5 | .453 | .475 |
| W-1--W-6 | .370 | .482 |
| W-1--W-7 | .406 | .469 |
| W-2--W-3 | .369 | .557 |
| W-2--W-4 | .657 | .596 |
| W-2--W-5 | .556 | .542 |
| W-2--W-6 | .412 | .506 |
| W-2--W-7 | .478 | .531 |
| W-3--W-4 | .519 | .457 |
| W-3--W-5 | .427 | .473 |
| W-3--W-6 | .347 | .476 |
| W-3--W-7 | .368 | .431 |
| W-4--W-5 | .513 | .449 |
| W-4--W-6 | .441 | .503 |
| W-4--W-7 | .482 | .484 |
| W-5--W-6 | .370 | .445 |
| W-5--W-7 | .394 | .429 |
| W-6--W-7 | .377 | .480 |
| Average water Saturation | .440 | .494 |

Figure 6:
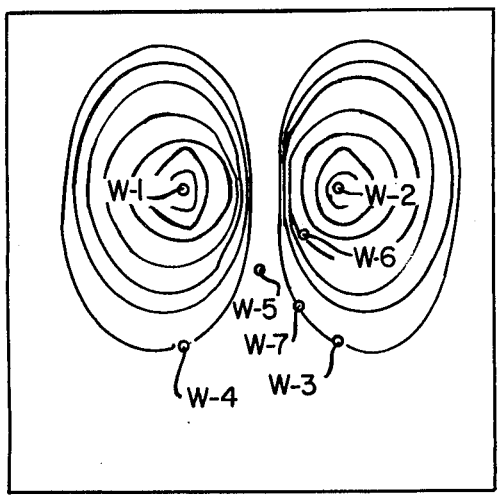
FIG. 6 is a graph showing isopotential lines calculated from the solution of Poisson's equation with input at certain wells only in a single layer model reservoir.

The saturation distribution indicates higher brine saturations toward electrodes W-1, W-2 and W-4 and lower values near the center and toward electrode W-3. FIG. 6. Is an isopotential map of the miniature reservoir calculated by the solutions of Poisson's equation. The impressed dc input is at electrodes W-1 and W-2, and these isopotential lines agree in shape with the isopotential lines presented by Van Nostrand et al, "Interpretation of Resistivity Data", geological survey professional paper of 499, 1966.

Simulated wells which also served as electrodes were constructed by capping five 75-centimeter lengths of 0.64 centimeter diameter stainless steel tubing at one end. These cap tubes were placed in a 1.91 centimeter diameter tygon tubing and held in a vertical position, and thereafter, the annular space was filled with concrete. After the concrete hardened, a diamond saw was used to cut slots through the cement and into the stainless steel tubing to act as perforations. The cuts were made over a 6 centimeter portion of the tubing to coincide with the center of the sand zone. Four such cuts were made in a radial fashion. Thereafter, the tygon tubing was removed and an 8 centimeter long piece of 50-50 mesh stainless steel screen extending 1 centimeter past the slots of both ends was used to prevent sand intrusion into the well. The screen was soldered at stops along the seam.

Shale tailings were obtained from drilling sites in Nowata County and immersed in a tank of water to form a mud shale. A 17 centimeter thick layer of mud shale was placed in the empty 127 centimeter square box, and the previously described simulated wells were set in position in the shale forming a five-spot with the outer wells forming a 1-meter square. Building sand, which had been topped through a number 14 sieve, was added to form a 10 centimeter thick layer as the middle formation in the box. 26.6 liters of oil and 26.6 liters of brine were poured simultaneously onto the sand giving a water or brine saturation of 0.50. The measured porosity of the packed sand was 33%. A 9 centimeter thick layer of shale was added as the top formation of the miniature model reservoir.

Resistivity of the sand when 100% saturated with brine ($R_o$) was determined using a 1.87 centimeter diameter, sand-packed tube fitted with end electrodes. The two-electrode ac method, previously discussed, was used to determine an $R_o$ value of 0.275 ohm-meter. Measurements of voltage and current for each set of wells were made with an ac input and values for $S_w$ were calculated using Poisson's equation.

The potential between wells was checked with no impressed EMF to determine the possibility of spontaneous potential resulting from the differences in ion concentration at the sand-shale interfaces. Voltages on the order of 0.1 volts were measured. The electrodes were shorted every night during the testing period to discharge these as much as possible.

100 milliliters of a 0.5 molar ferric chloride was pumped into one well and 100 milliliters of a 0.5 molar ferrous chloride solution was pumped into another well. The resistivity was measured using the EMF generated by the oxidizing and reducing solutions. Brine was pumped into the three remaining wells while producing the wells where oxidizing or reducing solutions were located. Background voltages were again obtained, and thereafter, the ferrous and ferric chloride solutions were pumped into other wells. Voltages and currents were again obtained for resistivity calculations. These solutions were then removed, and other oxidizing and reducing solutions described in the previously mentioned core tests were used. Values for $S_w$ were calculated for all the tests using Poisson's equation.

Figure 7:
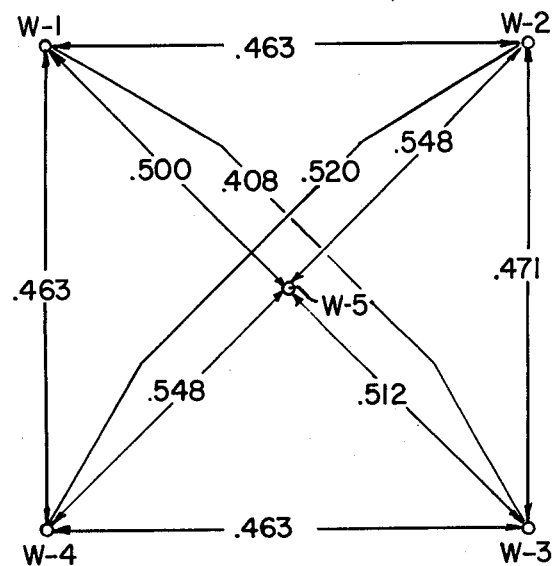
FIG. 7 is a graph showing the brine distribution calculated between wells in a multilayered, three-dimensional model reservoir using Poisson's equation.

The measured voltages with no oxidizing solutions and no impressed EMF, were on the order of 0.1 volts, as previously mentioned. The measured voltages with the oxidizing and reducing solutions did not differ significantly from the values recorded without the solutions present. Apparently, the solutions migrated along the bottom of the shale layer and came to contact with each other causing anomalous measurements, due to the small model reservoir size. In the field this problem would not occur and oxidation-reduction generated EMF's would be entirely adequate to obtain the necessary data. Because of this, only the impressed EMF's were used in the calculations. With impressed EMF, the average water saturation calculated from Poisson's equation was 49.1% compared to 50.0% by material balance. FIG. 7 shows the saturation distribution between wells, with brine saturation being higher toward the center and lower near the boundaries of the model reservoir.

All of the foregoing examples are adequate to demonstrate that interwell EMF measurements are obtainable using either impressed ac or dc voltages or voltages generated by oxidation-reduction reactions. In each case where measurable EMF's were obtained, saturation distributions were calculated using a computer program designed to solve Poisson's equation. Therefore, it is clear from the foregoing that combination of interwell of voltage and current measurements along with the application of Poisson's equation to the obtained data is sufficient to provide significantly important fluid saturation distribution information applicable to an entire set of wells. Interwell measurements have not heretofore been made and the calculations based thereon have never been suggested in the art. This method is of substantial importance in projecting oil saturation distributions between wells in an oil field for tertiary oil recovery.

While there has been described, what at present is considered to be the preferred embodiments of the present invention, it will be understood that various modifications and alterations may be made therein without departing from the true spirit and scope of the present invention, and it is intended to cover in the appended claims all such variations and modifications.

What is claimed is:

1. A method of determining the fluid saturation distribution in an oil and brine bearing formation penetrated by a plurality of open hole wells comprising the steps of: introducing an effective amount of an oxidizing solution into a first well and an effective amount of a reducing solution into a second well, introducing an electrode into the first well in contact with the oxidizing solution therein, introducing an electrode into the second well in contact with the reducing solution therein, interconnecting said first and second electrodes with an electrical conductor, measuring the current between the electrodes generated solely by the solutions in the first and second wells, calculating the apparent resistivity of the oil and brine bearing formation from the electrical current measurements, and determining the fluid saturation distribution between wells from the resistivity calculations.

2. The method set forth in claim 1, wherein the oxidizing solutions are salts with cations selected from a group consisting of iron, copper and mercury.

3. The method set forth in claim 1, wherein the reducing solutions are salts having the cations thereof selected from a group consisting of iron, copper and mercury.

4. The method set forth in claim 1, wherein the concentrations of the oxidizing and reducing solutions are not necessarily the same.

5. The method set forth in claim 1, wherein the amount of oxidizing and reducing solutions introduced into said wells is sufficient to produce an EMF therebetween substantially in excess of any background EMF between the wells without the reducing and oxidizing solutions therein.

6. The method set forth in claim 1, wherein current measurements are obtained between selected open hole wells geometrically distributed throughout the oil and brine bearing formation.

7. The method set forth in claim 6, wherein Poisson's equation is utilized to calculate the brine saturation distribution between wells, thereby to provide data for determining the oil saturation distribution throughout the oil and brine bearing formation.

8. The method set forth in claim 6, wherein the fluid saturation distribution determined is oil.

* * * * *